March 25, 1969 H. W. BLETZ Re. 26,554

NARROW TEMPERATURE DIFFERENTIAL THERMOSTATIC CONTROL

Original Filed Oct. 2, 1962

Sheet 1 of 3

INVENTOR.
HOWARD W. BLETZ

BY

McCoy, Greene, Medart & Lorton

ATTORNEYS

NARROW TEMPERATURE DIFFERENTIAL THERMOSTATIC CONTROL

Original Filed Oct. 2, 1962

INVENTOR.
HOWARD W. BLETZ

BY
McCoy, Greene, Mudek & Le Grotenhuis

ATTORNEYS

NARROW TEMPERATURE DIFFERENTIAL THERMOSTATIC CONTROL

Original Filed Oct. 2, 1962

INVENTOR.
HOWARD W. BLETZ

BY

McCoy, Greene, Medert & Le Protontino

ATTORNEYS

United States Patent Office

Re. 26,554
Reissued Mar. 25, 1969

26,554
NARROW TEMPERATURE DIFFERENTIAL THERMOSTATIC CONTROL

Howard W. Bletz, Mansfield, Ohio, assignor to Therm-O-Disc, Incorporated, Mansfield, Ohio, a corporation of Ohio Original No. 3,239,633, dated Mar. 8, 1966, Ser. No. 227,743, Oct. 2, 1962. Application for reissue July 28, 1967, Ser. No. 672,943
Int. Cl. H01h *37/12, 37/54, 37/74*
U.S. Cl. 337—347 9 Claims

Matter enclosed in heavy brackets [ ] appears in the original patent but forms no part of this reissue specification; matter printed in italics indicates the additions made by reissue.

This invention relates to a thermostatic control device and more particularly to a snap-acting thermostatic control device for making or breaking an electrical circuit within a relatively small temperature differential.

Heretofore, thermostatic control devices capable of carrying heavy loads, of comparative small size and embodying a bi-metallic element as the actuating member thereof have been characterized by a wide temperature differential. Such an operating condition in prior devices was due to the fact that the actuating element of the device did not respond readily to slight changes in temperature and required a build-up of thermal stress in the bi-metallic element which was brought about by a substantial change in temperature. This condition was further enhanced in thermostatic controls designed to operate with an over-center snap acting element for the reason that the thermal element had to overcome in addition to the resistance to its normal movement under temperature change the counteracting stress caused by the spring tension of the snap element.

A narrow temperature differential in a thermostatic control is highly desirable where the control is used in refrigeration, air conditioning and home heating devices and in many household appliances. Such devices which are designed to operate under heavy current load conditions require controls which can withstand such load condition. Prior devices capable of operating under such heavy load conditions were usually of the snap-acting over center spring type and although satisfactory for many purposes were incapable of performing within the desired temperature differential.

It is a primary object of the present invention to provide a thermostatic control device which overcomes the drawbacks and undesirable features of prior devices and is capable of operating under heavy load conditions within the desired predetermined temperature differential.

A further object of the present invention is to provide a new and novel thermostatically controlled device embodying switch means adapted to open and close in response to changes in temperature, and wherein substantial forces are developed for actuating the switch elements upon a relatively small change in temperature.

A still further object of the invention is to provide a thermostatically controlled switch capable of use with substantially current loads and wherein means are provided to develop forces which are capable of overcoming the effect of the high current on contiguous contacts and cause the separation thereof upon a relatively small change in temperature.

Another object of the invention is to provide a thermostatic control of high current carrying capacity, responsive to relatively small temperature changes, which is economical to manufacture, of relatively small size for its electrical load capacity and dependable and stable in operation under varying conditions of service.

Another object of the invention is to provide a new and novel thermostatically controlled device embodying switch means wherein a substantially contact separation is obtained by a snap action upon a relatively small temperature change.

A still further object of the invention is to provide a thermostatic control device embodying switch means actuated by a snap element having means for increasing the effectiveness of the snap element in opening and closing the contacts of the switch means.

Another object of the invention is to provide a thermostatic control embodying switch means including contact members wherein a clean make and break between the contacts is maintained throughout the life of the control.

It is a still further object of this invention to provide a a thermostatic control responsive to a bimetallic element attached at one end to a snap acting element of the over-center variety and having means confining movement of the snap acting element to one side only of its over-center position and wherein the snap acting element is responsive to small increments of stressing by the bimetallic element.

These and other objects and advantageous features of the invention not at this time more particularly pointed out will become more apparent as the nature of the invention is better understood from the following detailed description taken in conjunction with the accompanying drawings, wherein like reference characters denote corresponding parts, and wherein.

The device of the present invention is designed to open and close an electrical circuit in response to a relatively small change in temperature to which the device may be subject. The switching action is effected through the use of an over-center snap acting spring element which opens and closes the circuit with a snap action in response to pressure variations transmitted by a thermo-sensitive element. The snap acting element employed is arranged so that its movement is confined to only one side of its over-center position whereby at its furthest position from over-center, it engages a limiting stop member in which position the contacts of the switch are open and at the other extreme of its movement which is nearest the over-center position the contacts are engaged and the circuit is closed. At both of the extreme contact positions the snap acting element is under spring tension and exerts force in a direaction tending to open the contacts and the circuit. The thermo-sensitive element exerts a force on the snap acting element in a direction tending to close the circuit, thus providing a counter balancing pressure effective on the snap-acting element to snap it from one position to another upon changes in temperature by reason of the fact that pressure in the snap element changes at a more rapid rate than it does in the thermal responsive element.

The device of the present invention is particularly adaptable for use with an appliance where operation thereof over a relatively narrow temperature differential is desired. Since the pressure or force exerted by the snap acting element is always in the same direction, the switch members will respond to very slight thermally induced stresses in the thermosensing element. Such force developed in the thermosensing element need only be sufficient to counter-balance the spring tension in the snap acting element to open or close the electrical contacts.

Figure 1:
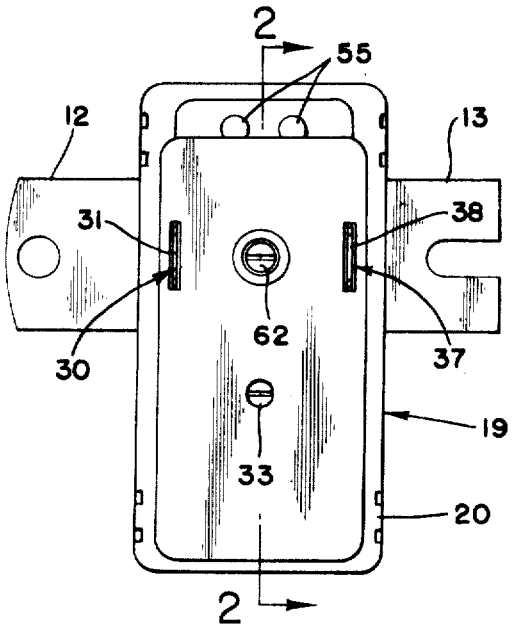
FIGURE 1 is a front elevation of a thermostatic control device embodying the present invention.
Figure 2:
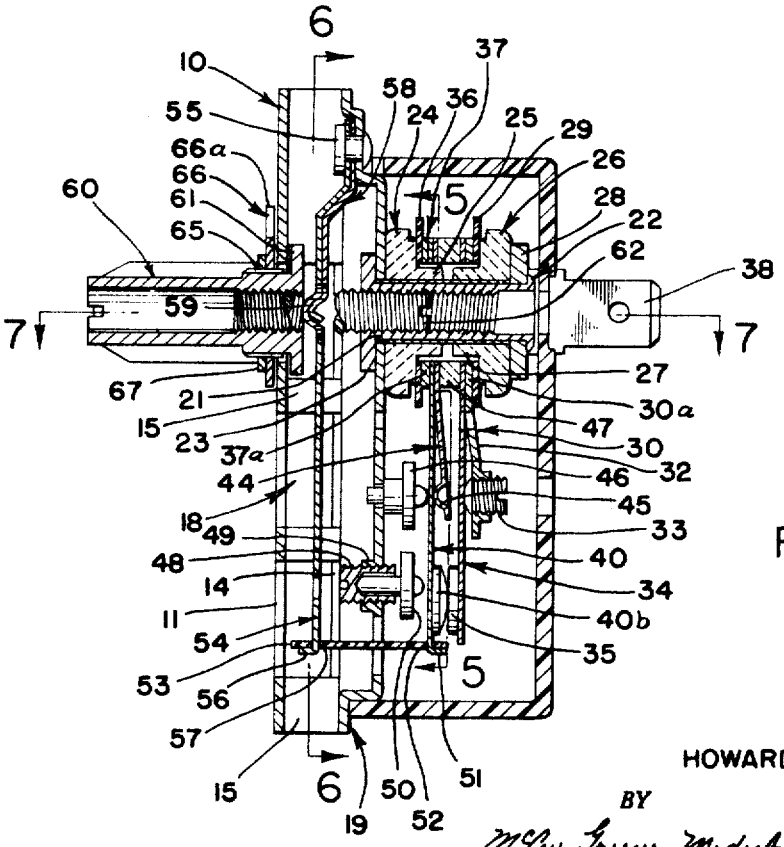
FIGURE 2 is a longitudinal sectional view taken on the line 2—2 of FIGURE 1.
Figure 3:
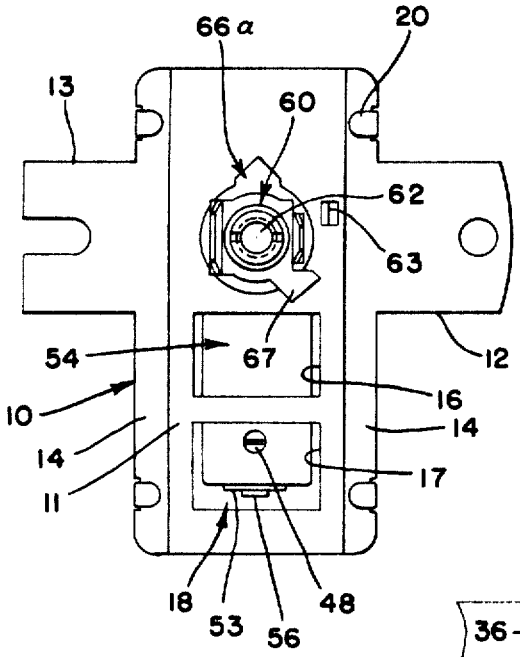
FIGURE 3 is a rear elevation of the embodiment of the invention shown in FIGURE 1.
Figure 4:
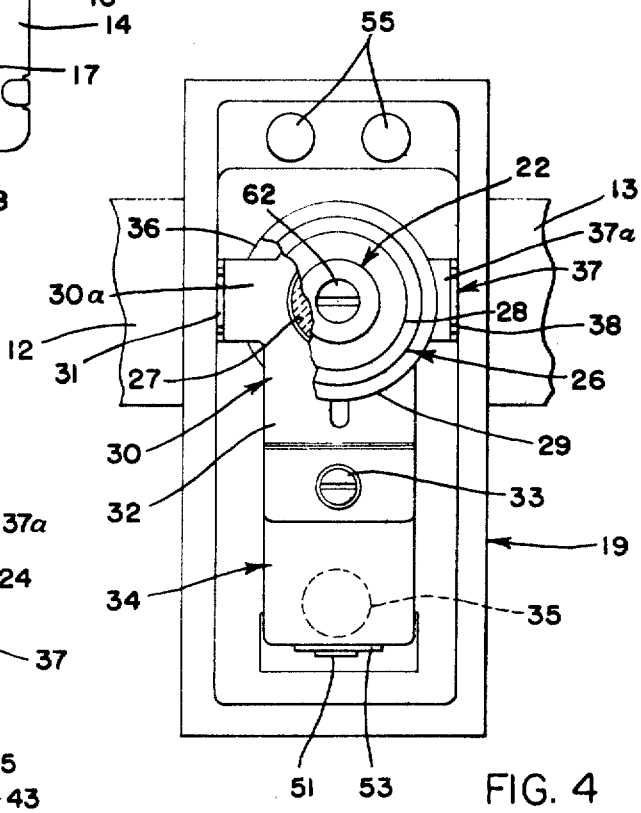
FIGURE 4 is a front elevation of the device shown with parts broken away and with the cover plate removed.
Figure 5:
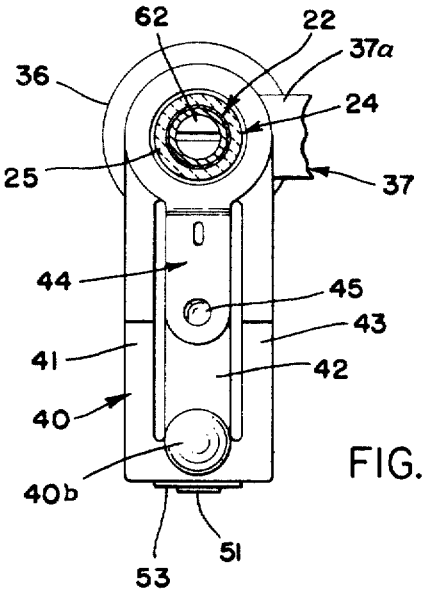
FIGURE 5 is a fragmentary sectional view taken on the line 5—5 of FIGURE 2.
Figure 6:
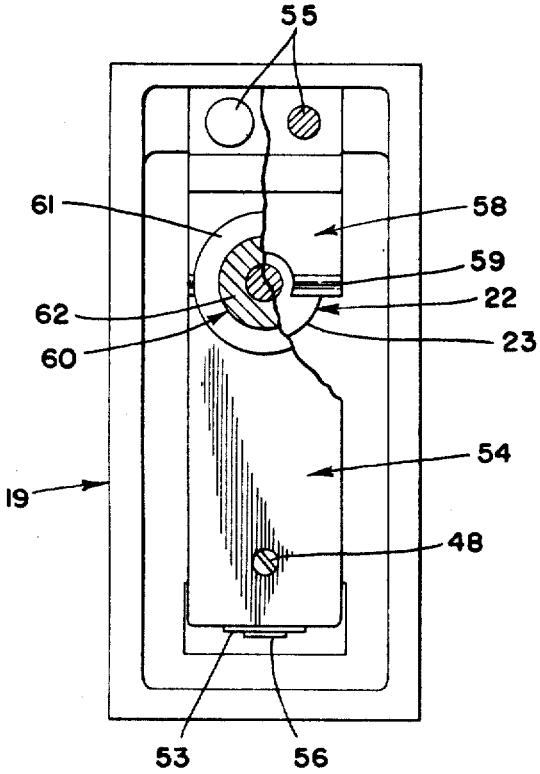
FIGURE 6 is a sectional view with parts broken away taken on the line 6—6 of FIGURE 2.
Figure 7:
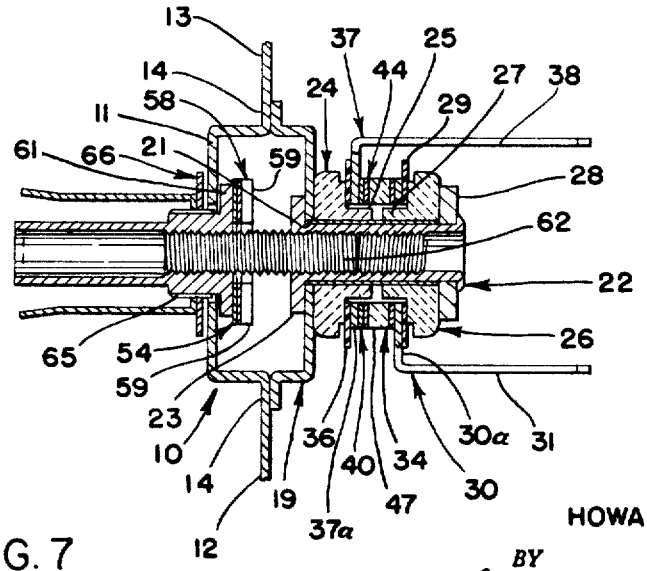
FIGURE 7 is a transverse sectional view taken on the line 7—7 of FIGURE 2.

Referring now to the drawings, and more particularly to FIGURES 1, 2 and 7 thereof, there is illustrated a snap-acting type thermostatic control device embodying the present invention and including a mounting frame broadly indicated by the numeral 10. The mounting frame 10 comprises a rear wall 11 having laterally extending bracket members 12 and 13 for attaching the control to an appliance or device with which it is to be used. Spaced outwardly from the rear wall 11 and co-extensive with the sides thereof are flange members 14 integrally connected to the rear wall by a plurality of straps 15. The rear wall is cut away as at 16 and 17 (FIGURE 3). Thus the mounting frame 10 defines an area 18 through which air may freely flow, for housing a bi-metallic member to be described hereinafter.

Mounted on the front of the frame 10 is a base or supporting member 19. Tabs 20 formed along the side edges of the base 19 are bent around the longitudinal flange members 14 of the mounting frame to secure the base 19 thereto. Adjacent one end of the supporting base 19 there is provided a circular opening 21 which is adapted to receive a tubular stack rivet 22. The rivet 22 is provided with a circular flange 23 at one end thereof which seats against the rear surface of the supporting base 19. Mounted on the portion of the rivet 22 projecting outwardly from the front surface of the base is a circular insulating ceramic member 24, one end face of which engages the adjacent surface of the base and the opposite end face of which is provided with an integral sleeve portion 25 projecting therefrom.

A similar insulating ceramic member 26 having a sleeve portion 27 is reversely mounted on the tubular rivet 22. The sleeve portions 25 and 27 of the respective ceramic members 24 and 26 form a cylindrical supporting guide for the stack of switch elements mounted between the opposing faces of the ceramic members 24 and 26, and will be described hereinafter. Mounted on the end of tubular rivet 22 is a circular washer 28 over which the outer end of the rivet 22 is flanged to secure the various elements mounted thereon in assembled relation.

The switch elements of the stack mounted between the opposed faces of the ceramic members 24 and 26 on the sleeve portions thereof (FIGURE 2) include a circular insulating washer 29 which serves to add insulation spacing from ground to current carrying parts, and a terminal post 30, L-shaped in cross section, the horizontal leg 30a of which has an opening therethrough adapted to receive the sleeve 27 and the other leg serving as a blade terminal portion 31 to which a suitable electrical connection may be made. The leg portion 30a of the terminal 30 has a laterally projecting supporting portion 32, which extends outwardly from the mounting rivet 22 at a slight angle to a plane parallel with the base 19. A threaded adjusting screw 33 is received in an internally threaded hollow boss formed on the supporting portion 32 of the terminal post 30.

A stationary contact carrying arm 34 having a circular opening at one end is arranged to be supported on the sleeve 27 of the ceramic member 26 contiguous to the leg portion 30a of the terminal. The arm 34 has mounted on the outer free end thereof a fixed contact member 35. The end of the adjusting screw 33 on the supporting portion 32 of the terminal post 30 engages the adjacent surface of the arm 34 and serves to adjust the relative position of the contact member 35.

Carried on the sleeve portion 25 of the ceramic member 24 is an insulating washer 36 similar to the washer 29 and a terminal 37, L-shaped in cross-section with a circular opening in the horizontal leg 37a thereof to receive the sleeve portion 25. The other leg 38 of the terminal 37 is arranged to be connected to a suitable current source.

Adjacent to the terminal 37 on the sleeve portion 25 is an over-center snap acting element 40 having a circular opening 40a in one end thereof to receive the said sleeve portion. The element 40 includes the mobile contact carrying arm of the switching unit which has mounted on the outer end thereof contact member 40b positioned to engage the contact member 35 on the stationary contact arm 34 when the circuit is closed.

Figure 8:
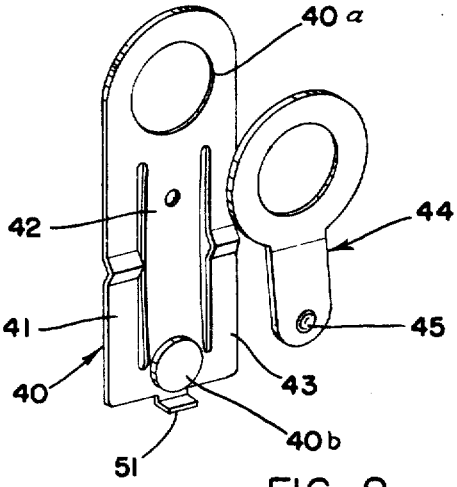
FIGURE 8 is an isometric view showing the snap element and pressure spring disassembled from the control.

The over-center snap-acting element 40 is best shown in FIGURE 8 disassembled from the stack rivet 22. The snap-acting element 40 includes outer strips 41 and 43 and an intermediate strip 42. The strips 41 and 43 are V-crimped intermediate their ends in order to slightly shorten the overall length thereof. This places the strips 41 and 43 in tension and the center strip 42 in compression; hence the strip 42 will bow to one side or the other of a neutral axis.

Mounted on the sleeve 25 contiguous to the snap acting element 40 is a pressure spring 44 having a circular opening in one end thereof to receive the sleeve 25. The spring 44 extends along the strip 42 of the snap element and is formed at its outward end with a pressed out knob 45 which engages the surface of the compression portion 42 of the snap-acting element 40. Opposed to the knob 45 and supported on the base 19 is a stop member 46, made of a suitable insulating material which serves to support the intermediate strip 42 of the snap-acting element. A ceramic insulating ring 47 is positioned on the tubular rivet 22 between the pressure spring 44 and the stationary contact-carrying arm 34 of the switch assembly.

A threaded adjusting screw 48 extends through an internally threaded boss 49 formed in the base member 19. Affixed to the forward end of the adjusting screw 48 is an insulating stop member 50 arranged to engage the outer free end of the snap element 40 when the contacts 35 and 40b are separated. By adjusting the screw 48 movement of the end of the snap-acting element may be limited to a predetermined distance with respect to the stationary contact arm 34.

The outer end of the snap-acting element 40 has a connecting tab 51 formed thereon which is bent at right angles and extends through a rectangular opening 52 formed in one end of an insulating connector 53. The insulating connector 53 is of rectangular shape, formed of a durable low conductivity material and extends through a rectangular opening in the base 19 (FIGURE 2). A thermosensitive elongated bi-metallic member 54 is positioned within the area 18 defined by the mounting frame 10 and is cantilever mounted at one end of the base plate 19 by means of rivets 55 as shown in FIGURE 2. The outer free end of the bi-metallic member 54 has an integral tab 56 bent at right angles and arranged to be received in an opening 57 in the insulating connector 53.

A leaf pressure spring 58 overlying the bi-metallic member 54 is secured in position between the bi-metallic member 54 and base plate 19 by means of the rivets 55 and has a bifurcated end, each prong of which is formed with a V-crimp 59. The apex of each V-crimp 59 bears against the bi-metallic member 54 and serves to urge the end thereof away from the base plate to separate the contacts 35 and 40b.

A hollow cylindrical adjusting stem 60 projects through an opening in the rear wall 11 of the mounting frame 10 as shown in FIGURES 2 and 7. A circular flange 61 formed on the end of the stem 60 has its inner surface overlying the rear wall 11, and its outer surface engaging the bi-metallic member 54 to maintain the same in adjusted position.

A calibration screw 62 is threaded through the adjusting stem 60 into a threaded portion of the tubular stack rivet 22. This screw is normally held stationary in relation to the adjusting stem 60 for adjustment of the bi-metallic member 54. Rotation of the adjusting stem 60 is generally limited by a projecting tab 63 which extends upwardly from the outer surface of the rear wall 11 of the frame 10. The tab serves to limit the range over which the bi-metallic member 54 may be positioned.

The adjusting stem 60 has a cylindrical knurled portion 65 which receives an indicator 66 and an adjusting stem driver 67. The pointer 66a of the indicator 66 indicates the position at which the bi-metallic member is set and may be used in conjunction with a calibrated dial.

In the operation of the device, a change in temperature creates a change in the force withtin the thermo-sensitive member 54 which in turn influences the snap acting member 40 to effect the closing or opening of the contacts 35 and 40b of the switch assembly. It is to be noted that the force built up in the thermal member 54 does not cause the member to move but merely serves to exert through the linking member 53 sufficient force to counterbalance the spring tension in the snap-acting element 40 and effect a closing of the contacts 35 and 40b. The engagement of the contacts will take place with a snap action since the spring tension in the snap acting element 40 decreases at a faster rate than the dissipation of force in the bi-metallic member 54 as the snap-acting element moves toward its over-center position. The pressure built up in the bi-metatllic member 54 will be considerably greater than the opposing spring tension force in the snap acting element 40, resulting in the contact member carried by the snap-acting element being held in its engaged position against the stationary contact member 35, but nevertheless short of its over-center position.

This invention affords considerable improvement over former snap-acting type thermostats in that it is not necessary for the bi-metallic member to move the over-center device from one unstressed position to the other. Thus, it is not necessary for the thermal stress in the bi-metallic member to build up in the point where it exerts a force sufficient to overcome the spring tension in the snap-acting element necessary to move it from one side of its over-center position to the other. This allows for operation throughout a very narrow temperature differential.

A further advantage of this device is that its operation is not dependent upon movement of the bi-metallic member. The device is designed to operate by pressure build-up in the bi-metallic member rather than as a result of its movement.

It will be understood that the above description is by way of illustration rather than limitation and that variations and modifications of the specific device herein shown and described may be made without departing from the spirit of the invention.

Having thus described my invention, I claim:

[1. In a thermostatic control device, a switch assembly comprising a fixed contact member and a mobile contact-carrying member comprising an over-center snap-acting element cantilever mounted and having a mobile contact mounted on the free end thereof with snap means between the fixed end and the free end to move said mobile contact into and out of engagement with the fixed contact member with a snap action, means confining said snap-acting element to movement between two predetermined points on one side of the overcenter position and being biased to apply force in one direction only between its limits of movement, and means to apply thermally induced pressure to effect movement of said snap-acting element between its extreme points of movement in response to changes in temperature.]

[2. A device as defined in claim 1 wherein said means for applying thermally induced pressure comprises a thermo-sensitive bi-metallic member, cantilever mounted to apply pressure to the contact-carrying end portion of the snap-acting element to overcome tension in said element and thereby cause said snap-acting element to move from one predetermined point to another and open or close the circuit with a snap action.]

[3. A device as defined in claim 1 wherein said means for applying thermally induced pressure comprises a thermo-sensitive bi-metallic member, cantilever mounted to apply pressure to the contact-carrying end of the snap-acting element to overcome the force of the snap-acting element between predetermined temperature limits and to cause the snap-acting element to move from one predetermined point to another and thereby open or close the circuit; and means for adjusting said bi-metallic member to vary the said predetermined temperature limits.]

[4. A device as defined in claim 3 wherein said means for adjusting the bi-metallic member comprises a threaded shaft rotatably mounted and arranged to engage said bi-metallic member and to move said member to vary the predetermined temperature limits within the which the circuit will be open or closed and manually actuated calibrated control means mounted on said shaft.]

[5. In a thermostatic control device, a switch assembly comprising a fixed contact member; an over-center snap-acting element having a fixed end portion, a movable contact-carrying end portion, and snap means between the fixed end portion and the movable end portion; said movable end portion adapted to engage and disengage the contact member carried thereby with said fixed contact member with a snap action; means for limiting the movement of the contact carrying end of said snap-acting element between two predetermined points of the over-center position; a thermo-sensitive bi-metallic member arranged to transmit thermally induced pressure to the contact carrying end of said snap-acting element to cause the contact carrying portion thereof to snap between its exreme limits of movement.]

[6. A device as defined in claim 5 wherein said means to limit the movement of said snap-acting element comprises two adjustable stops, one being the stationary contact member arranged to stop the movement of the contact-carrying end of the snap-acting element just short of its over-center position, and the other arranged to stop said end portion short of its unstressed position, such stops serving to maintain said snap-acting element biased in the same direction throughout its entire range of movement.]

[7. A device as defined in claim 6 wherein said snap-acting element is a flat metal strip stressed for over-center snap action and having a substantially sinusoidal force characteristic when moving unrestricted from one unstressed position to the other.]

[8. A snap-acting thermostatic switch comprising a housing; spaced electrical terminals mounted within said housing; switching means interposed between said terminals, said switching means comprising a stationary contact member electrically connected to one of said terminals and a mobile contact member mounted on an over-center snap-acting element electrically connected to the other terminal, means arranging said snap acting element to engage and disengage the contact member carried thereby with said stationary contact member; means confining movement of said snap element between two predetermined points on one side of the over-center position so that said snap-acting element is biased to apply force in the same direction at both limit points of its movement; and a thermo-responsive member being adapted to apply thermally induced pressure to the contact carrying end portion of the snap-acting element to cause said snap-acting element to engage and disengage said contact members with a snap action.]

[9. A snap-acting thermostatic switch comprising a housing; spaced electrical terminals mounted within said housing; switching means comprising a fixed contact member electrically connected to one of said terminals, and an over-center type snap-acting element electrically connected to the other terminal, said snap-acting element having a fixed end and a movable end carrying a contact member mounted to engage and disengage with said fixed contact member; means for limiting the movement of the contact carrying end of said snap-acting element between two predetermined points on one side of the over-center position; a thermo-sensitive bi-metallic member adapted to apply thermally induced pressure to the contact carrying end portion of said snap-acting element to cause said contact member carried thereby to engage said fixed contact member to open or close the circuit between said terminals with a snap action.]

[10. A device as defined in claim 9 wherein said means to limit the movement of said snap-acting element comprises two adjustable stops, one stop being the stationary contact member arranged to stop the movement of the contact carrying end of the snap-acting element just short of its over-center position when the two contact members are engaged, and the other stop arranged to limit the movement of the mobile contact member and to stop said snap-acting element short of its unstressed position, said stops serving to maintain said snap-acting element biased in the same direction throughout its entire range of movement.]

*11. A thermostatic control device comprising a body, a first resilient metallic contact support cantilever mounted in said body at a first location providing a first contact adjacent its free end, an over-center snap assembly including a second resilient metallic contact support cantilever mounted in said body in a second location spaced from said first location providing a second contact adjacent to its free end, movement of said free end of said second contact support causing said second contact to move between a first position in engagement with said first contact and a second position spaced from said first contact, first and second electrical terminal means connected to said first and second contact supports, respectively, said terminal means being electrically connected when said contacts engage with said supports providing part of the electrical connection therebetween, said snap assembly also including snap spring means connected between said body and said free end of said second contact support operable to move said second contact between said first and second positions with snap action, cantilever mounted thermal responsive bimetallic spring means spaced from said contact supports operable to provide a thermally induced force having a magnitude which is a function of its temperature, the free end of said bimetallic spring means overlying said free end of said snap assembly, an elongated member directly connected between said free end of said thermal responsive spring means and the free end of said second contact support, said elongated member being provided with opposed surfaces with one engaging said free end of said snap assembly and the other engaging said free end of said bimetallic spring means, said elongated member operating to apply said thermally induced force to the free end of said second contact support, the magnitude of said thermally induced force being substantially unaffected by temperature changes of said contact supports caused by electrical flow therethrough, said snap spring means and said thermal responsive spring means cooperating to produce a first resulting force urging said second contact toward said first contact when said second contact first moves to said first position and cooperating to produce a second resulting force urging said second contact away from said first contact when said second contact first moves to said second position, first adjustment means adjustably determining the spacing between said contacts when said second contact is in said second position and thereby adjusting the differential in temperature of said thermal responsive means required between opening and closing of said contacts, and second adjusting means adjustably determining the temperature of said thermal responsive means which produces movement of said second contact from said second position to said first position without affecting said differential temperature.*

*12. A thermostatic control device as set forth in claim 11 wherein third adjusting means are provided to adjustably determine the spacing of said free end of said second contact support from its over-center position when said second contact is in one of said positions.*

*13. A thermostatic control device as set forth in claim 11 wherein said first contact support is a thin metal strip mounted at one end on said body, and said first contact is mounted on the other end thereof, said metal strip being unsupported adjacent to said first contact on the side thereof remote from said second contact so that said first contact is free to move a limited amount when engaged by said second contact.*

*14. A thermostatic control device as set forth in claim 13 wherein said over-center snap assembly is a unitary element including a plurality of substantially parallel legs, at least one of said legs being stressed in compression to provide said snap spring means, and at least another of said legs being stressed in tension, and means are provided to locate a portion of said one leg with respect to said body at a location spaced from both ends of the leg which is stressed in tension.*

*15. A thermostat as set forth in claim 14 wherein said unitary element includes three substantially coplanar legs, the center leg being stressed in compression and the other two legs being stressed in tension.*

*16. A thermostatic control device as set forth in claim 15 wherein said over-center snap assembly is on the same side of its over-center position in both said first and second positions.*

*17. A thermostatic control device as set forth in claim 14 wherein said parallel legs are connected to each other at their ends, and said means for locating a portion of said one leg with respect to said body includes a projection carried by said body engaging one side of said one leg intermediate its ends and means engaging the other side of said one leg pressing the said one leg against said projection.*

*18. A thermostatic control device as set forth in claim 17 wherein said second contact support and said bimetallic spring means are substantially parallel and coextensive.*

*19. A thermostatic control device as set forth in claim 18 wherein said body includes a wall extending between and substantially parallel to said second contact support and said bimetallic spring means.*

References Cited

The following references, cited by the Examiner, are of record in the patented file of this patent or the original patent.

UNITED STATES PATENTS

| | | | |
|---|---|---|---|
| 2,175,721 | 10/1939 | Taylor | 200—67 X |
| 2,691,712 | 10/1954 | Malone | 200—138 |
| 2,499,208 | 2/1950 | Zimmer | 200—138 |
| 2,833,893 | 5/1958 | Weber | 200—138 |
| 2,851,556 | 9/1958 | Valkenburg | 200—122 |
| 2,891,128 | 6/1959 | Bolesky | 200—138 |
| 2,897,319 | 7/1959 | Wolfe | 200—122 |
| 3,015,007 | 12/1961 | Howard | 200—67 X |
| 1,516,195 | 11/1924 | Lewerenz | 200—67 |
| 2,074,132 | 3/1937 | Rich | 200—139 |
| 2,170,748 | 8/1939 | Eaton. | |
| 2,204,793 | 6/1940 | Davis. | |
| 2,218,908 | 10/1940 | Fonseca | 200—140 |
| 2,340,056 | 1/1944 | Harrison. | |
| 2,715,167 | 8/1955 | Mertler. | |
| 2,814,711 | 11/1957 | Plint. | |
| 2,879,357 | 3/1959 | Them. | |
| 2,985,738 | 5/1961 | Baak. | |
| 3,177,321 | 4/1965 | Grimshaw | 200—140 |

FOREIGN PATENTS

| | | |
|---|---|---|
| 592,891 | 2/1960 | Canada. |
| 1,260,037 | 3/1961 | France. |

BERNARD A. GILHEANY, *Primary Examiner.*

R. L. COHRS, *Assistant Examiner.*

U.S. Cl. X.R.

337—368